June 15, 1937.  H. A. CHASE  2,083,942
METHOD AND MEANS FOR LIFTING VEHICLES HAVING LEAF SPRINGS
Filed March 4, 1935
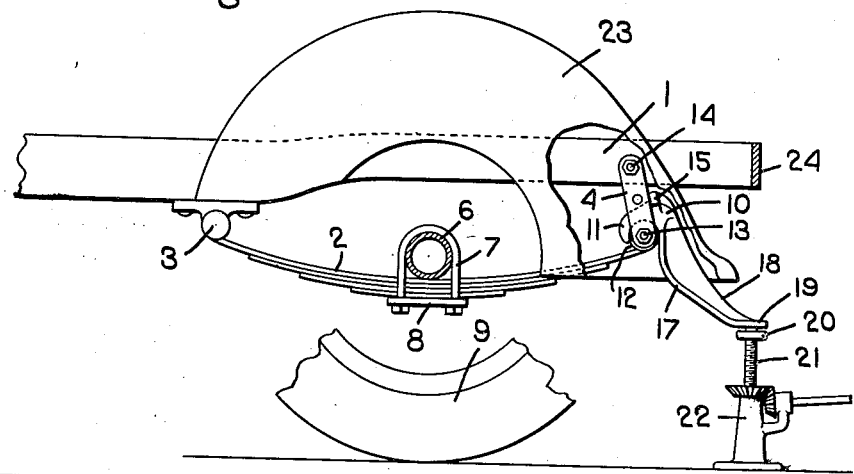
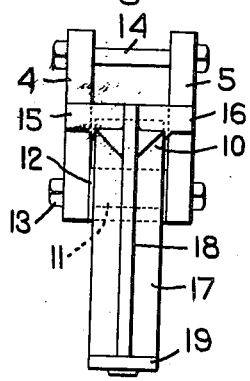 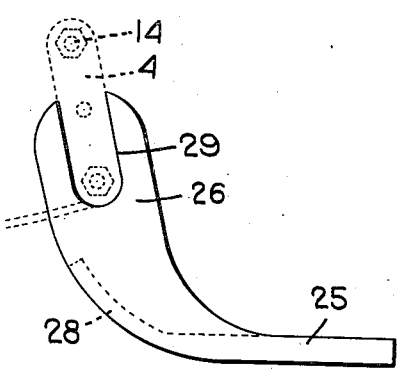 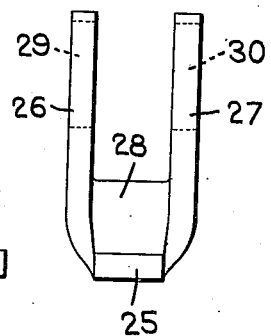
Inventor.
Henry A. Chase
by Heard Smith & Tennant.
Attys.

Patented June 15, 1937

2,083,942

UNITED STATES PATENT OFFICE 2,083,942

METHOD AND MEANS FOR LIFTING VEHICLES HAVING LEAF SPRINGS

Henry A. Chase, Newtonville, Mass., assignor of one-half to Lewis W. Mustard, Wellesley Hills, Mass.

Application March 4, 1935, Serial No. 9,258

6 Claims. (Cl. 267—54)

This invention relates to improvements in methods and means for lifting or jacking up a portion of a vehicle having spring leaves, and the principal object of the invention is to apply the lifting force to a vehicle through a spring shackle in such manner as to obtain an advantageous leverage and also to enable power to be applied in a convenient manner.

More specifically the invention relates to means for conveniently lifting or jacking up automobiles in which the body is supported upon leaf springs to permit the changing of wheels or tires, or the making of such repairs as require the hoisting of a portion of the automobile.

During recent years the tendency of automobile manufacturers has been to provide mechanism enabling the bodies of automobiles to be supported more closely to the ground, thereby lowering the center of gravity in such manner as to increase the stability of the vehicle against tipping. The fenders and the end portions of the body have therefore been lowered to such a degree that it is exceedingly difficult for an operator or mechanic to introduce a jack beneath the axle of the car, particularly the rear axle, to enable it to be jacked up in the usual manner, especially when the body of a portion of the car is lowered still further by the collapse of a tire caused by a puncture or blowout.

The present invention comprises the method of lifting or jacking up a portion of a vehicle having a leaf spring which is connected at one end to the frame of the vehicle by a spring shackle which comprises applying a lifting force through the spring shackle, which is readily accessible, as to raise that portion of the vehicle to which the spring shackle is attached. By the present method a leverage is applied through the spring shackle to the spring and frame of the vehicle from a convenient position which will not require the operator to crawl beneath the car or to be subjected to any other serious inconvenience.

A further object of the invention is to provide a method of lifting or jacking up a portion of the vehicle having a leaf spring by applying a force to the spring shackle in a direction operable first to impose a longitudinal tension upon the spring, thereby preventing expansion of the spring and the lowering of the wheels of the vehicle during the lifting movement.

A further object of the invention is to provide lifting mechanism for a vehicle having a leaf spring connected at an end to the frame of a vehicle by a spring shackle comprising a member extending outwardly from the spring shackle and maintained in fixed relation thereto and adapted when elevated at its free end to raise the portion of the vehicle to which the spring shackle is attached.

A further object of the invention is to provide a device which can readily be detachably secured to the spring shackle of a vehicle in a fixed relation thereto and having an outward extension of sufficient length to project beyond the mudguard and to be conveniently engaged by a jack or other power applying means.

These and other objects and features of the invention will more fully appear from the following description and the accompanying drawing and will be particularly pointed out in the claims.

In the drawing:

Fig. 1 is an illustration, partly broken away, of a rear portion of an automobile chassis and wheel, showing the rear leaf spring, an auxiliary lifting device detachably secured to the spring shackle, and a jack for applying power to the rearwardly extending arm of the auxiliary lifting device;

Fig. 2 is a rear view of the auxiliary lifting device applied to the spring shackle;

Fig. 3 is a side elevation of a modified form of auxiliary lifting device as applied to a spring shackle which is illustrated in dotted lines;

Fig. 4 is a rear view of the device shown in Fig. 3.

An embodiment of the invention is illustrated in Figs. 1 and 2 of the drawing as applied to the chassis of a vehicle, such as an automobile of a usual type, having a frame 1 upon which the body of the vehicle (not shown) is supported, a pair of leaf springs 2 pivotally secured at the front end to a bracket 3 and at its rear end connected by a pair of shackle links 4 and 5 to the frame of the vehicle. The rear axle housing 6 rests upon and is secured by U-shaped bolts 7 to the spring chair 8 and the wheel 9 (only a portion of which is shown) is mounted upon the axle which extends through the axle housing 6.

In the construction shown in Figs. 1 and 2, the lifting mechanism comprises an auxiliary jacking device in the form of a lever having a head 10 provided with a downwardly extending hook-shaped portion 11 adapted to extend between the shackle links 4 and 5 and to engage over the eye 12 of the spring which encircles a shaft or stud 13 which passes through and connects the lower ends of the spring shackle links 4 and 5, the upper ends of the shackle links 4 and 5 being secured to the frame by a bolt 14. The head 10 of the auxiliary jack is provided with laterally extending bosses 15 and 16 which present shoulders which engage the rear edges of the links 4 and 5.

The jacking device has an integral rearwardly extending arm 17 which preferably is curved and is provided with a central longitudinally extending reenforcing rib 18. The end portion 19 of the arm 17 may be flat or provided with a projection or socket adapted to be engaged by a suitable swivel plate 20 upon the screw 21 of a usual form of jack 22. Of course, any other suitable power applying device may be employed to exert a lifting force upon the arm 17 of the auxiliary jacking device.

The auxiliary jacking device can readily be made of such a size and shape that it can be introduced between the mudguard and the shackle and its hooked portion inserted between the shackle links so that the hook will engage the spring eye and upon lifting the arm 17 the shoulders 15 and 16 will engage the shackle links in such manner as to be maintained in fixed relation thereto, and operable when the free end of the arm is elevated to raise that portion of the vehicle to which the spring shackle is attached.

The arm 17 may be made of such curvature and length as to extend beyond the end of the mudguard 23 and also beyond the end of the usual bumper 24 so that the jack, or other lifting device, can be conveniently caused to engage the free end portion of the arm 17.

By reason of the fact that the auxiliary jacking device when applied as above described is maintained in fixed relation to the shackle links, the lifting force applied to the end of the arm 17 tends to swing the spring shackle about its pivotal bolt 14, thereby exerting a longitudinal tension upon the spring which will prevent it from expanding and sagging as would be the case if the lifting force were directly applied to the frame of the vehicle, in which case the frame would have to be raised a considerably greater distance in order to remove the wheel from its engagement with the ground.

In the usual operation of jacking up a portion of the vehicle by a jack placed under the axle, the portion of the vehicle, which is raised, is in the nature of a lever carrying a weight, the fulcrum of the lever being the line of contact between the other wheels, such as a front wheel and the ground. By reason of the present invention in which the lifting force is applied to the rear shackle link, a considerably greater leverage is produced, thereby requiring less force to be applied through the jack than would be the case if the jack were placed underneath the axle.

A modified form of the invention is illustrated in Figs. 3 and 4, in which the auxiliary jacking device comprises an arm 25 having integral therewith shackle-engaging members 26 and 27, the lower portions of which are connected by a web 28 and the upper portions of which are provided with parallel slots 29 and 30, the walls of which are adapted to fit upon and engage the opposite edges of the links 4 and 5 respectively. The slots 29 and 30 are open at their outer ends and are of such depth as to engage a sufficient portion of the edges of the shackle links that the auxiliary device will be maintained in fixed relation to the shackle link as the rear end of the arm 25 is raised by a suitable power applying device.

The arm 25 may be of any suitable shape to extend rearwardly beyond the end of the mudguard 23 and also if desired beyond the end of the bumper 24.

By reason of the present invention therefore lifting device for vehicles having a leaf spring is provided which comprises a member adapted detachably to engage the spring shackle in a fixed relation thereto, with the free end of the lifting device or arm projecting rearwardly sufficiently to enable a jack, or other lifting device, to be conveniently applied to the free end of the arm, so that the portion of the vehicle to which the spring shackle is attached can be readily lifted without the necessity of introducing a jack or other lifting device in a difficult place, such as beneath the axle or beneath a practically inaccessible part of the frame of the vehicle. Considerable advantage in leverage is also obtained by the lifting mechanism herein set forth.

So far as I am aware the method of jacking up a vehicle having a leaf spring connected at an end to the frame of the vehicle by a spring shackle by applying a lifting force through the spring shackle, and the portion of the vehicle frame to which it is attached, is novel, and it will be understood that the particular mechanisms for performing the method and for applying force in the manner described are of an illustrative character and not restrictive of the meaning and scope of the following claims.

It will also be understood that while the invention is illustrated and more particularly described herein as applied to the rear spring of the vehicle, it may be employed in connection with front springs, or other leaf spring mechanism where the shackles are conveniently accessible.

Having thus described the invention, what is claimed as new, and desired to be secured by Letters Patent, is:

1. A lifting device, for vehicles having a leaf spring connected at an end to the frame of a vehicle by a spring shackle, comprising an arm having means detachably to engage the spring shackle in fixed relation thereto and extending outwardly therefrom a convenient distance to be engaged by a power applying means.

2. A lifting device, for vehicles having a leaf spring connected at an end to the frame of a vehicle by a spring shackle, comprising an arm having a bifurcated head portion adapted to fit the lower portion of the shackle and extending such distance therefrom as to be conveniently engaged by a power applying means.

3. A lifting device, for vehicles having a leaf spring connected at an end to the frame of a vehicle by a spring shackle, comprising a member having a hook-shaped end portion to engage over the eye of the spring, a shoulder to engage the edge of the shackle link and an arm extending outwardly therefrom at such distance as to be conveniently engaged by a lifting device.

4. An auxiliary jacking device for vehicles, having a leaf spring connected to an end of the vehicle frame by a pair of spring shackle links, comprising a member having a head provided with means detachably to engage both links of the spring shackle in such manner as to maintain a fixed relation thereto, and an outward extension of sufficient length to be conveniently engaged by a power applying means.

5. An auxiliary jacking device for vehicles, having a leaf spring connected to an end of the vehicle frame by a pair of spring shackle links, comprising a member having a bifurcated head adapted to fit and detachably to engage the lower portion of both of the spring shackle links and to maintain a fixed relation thereto, and an outwardly extending arm of sufficient length to be conveniently engaged by a power applying device.

6. An auxiliary jacking device for vehicles comprising a member having a head provided with a hook-shaped portion to engage the eye of the spring, shouldered portions to engage the links of the spring shackle, and an outwardly extending arm adapted to be engaged by a power applying device.

HENRY A. CHASE.